March 18, 1969  G. V. LARSEN  3,433,230

STONE TRAP FOR COMBINES

Filed March 10, 1966

INVENTOR:
GARY V. LARSEN
ATTORNEY

United States Patent Office 3,433,230
Patented Mar. 18, 1969

3,433,230
STONE TRAP FOR COMBINES
Gary V. Larsen, Racine, Wis., assignor to J. I. Case Company, Racine, Wis., a corporation of Wisconsin
Filed Mar. 10, 1966, Ser. No. 533,343
U.S. Cl. 130—27    6 Claims
Int. Cl. A01f 7/02, 12/20, 12/00

ABSTRACT OF THE DISCLOSURE

A stone trap for combines having a conveyor and a concave spaced from the conveyor. A stone trap is movably disposed in the space between the conveyor and the concave, and the trap provides means for holding stones and for moving to a position for dumping the stones. The trap is rotatably mounted, and seals extend between the trap and the conveyor and the concave. Also, the trap has upturned ends for retaining the stones during a portion of the rotation of the trap.

---

This invention relates to a stone trap for a threshing machine.

Stone traps for threshing machines and combines are commonly employed between the conveyor, bringing the crop into the machine, and the concave. These traps are usually arranged to receive a stone which may be moved along with the crop, and the stone is therefore intercepted by the trap so that it will not be passed to the concave and cooperating cylinder. By use of the stone trap, the concave and the cylinder are protected from damage by stones. These traps are usually in the form of containers for collecting the stone, or they are in the form of a movable plate serving as a part of the concave itself such that when the cylinder rotates to cooperate with the concave, the stone trap is actuated to release a stone which may be wedged between the cylinder and the trap.

The stone traps heretofore known thus may be made of a container or drawer which is arranged to be periodically removed by the operator to empty it of the stones collected. It of course may also be of the type which does not actually collect stones, but instead simply releases a plate or shelf when a stone becomes lodged between the shelf and the cylinder, and the stone is then allowed to drop away from the cylinder as the shell is pivoted downwardly. This of course requires a spring-type release having a predetermined setting so that it will react to a minimum force in releasing the stone. Further, it requires that the operator manually control the stone trap for either the emptying of the drawer or for the resetting of the shelf after it has once been tripped by a stone.

It is a general object of this invention to provide a stone trap which is an improvement over those heretofore known.

A more specific object of this invention is to provide a stone trap which serves to collect stones before they move to the concave, and to provide a means for dumping the stones, with the means being either automatic or manually operable, at the selection of the operator. In accomplishing this particular object, a stone trap is provided without requiring any special arrangement of the concave itself in that the trap is completely independent of the concave and is simply related thereto in that it is disposed forwardly of the concave and the latter can then serve its normal and full function since no special concave is required.

A further object of this invention is to provide a stone trap which collects and releases stones without requiring that the machine or any part thereof be interrupted in its normal operation.

Other objects and advantages become apparent upon reading the following description in light of the accompanying drawings, wherein.

Figure 1:
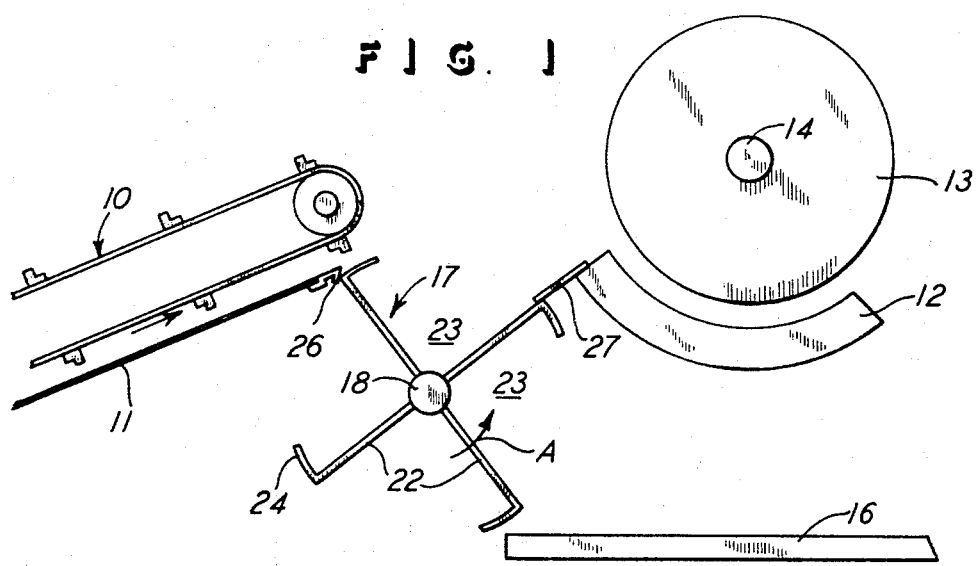
FIG. 1 is a side elevational view of part of the apparatus related to this invention.

The stone trap of this invention would normally be employed in a threshing machine or a combine of well-known construction. Thus, the conveyor, generally designated 10, is fragmentarily shown in FIG. 1. It will be understood that the conveyor is operating to move crops upwardly along a shelf 11 in a threshing machine or combine. The usual concave 12 is mounted in a spaced relation from the conveyor 10, and the usual cylinder 13 is rotatably mounted on a shaft 14 above the concave 12. Finally, a grain conveyor or bin 16 is disposed below the concave 12 to receive the grain which is normally produced by the action of the rotation of the cylinder 13 against the crop placed on the concave 12.

The aforementioned parts are of course suitably mounted in the machine, and are all of a conventional nature and therefore need not be further shown or described for one skilled in the art to understand them.

A stone trap generally designated 17 is disposed between the conveyor 10 and the concave 12 to span the space therebetween as shown. The trap 17 is movably mounted, by pivoting or rotating with respect to its shaft 18 which is rotatably mounted in the stationary sides 19 and 21, shown in dotted lines in FIG. 2 and representing the side panels of the threshing machine. Thus the sides 19 and 21 present sides or ends to the stone trap 17 which is provided with a plurality of radially extending partitions 22 suitably connected to the shaft 18. The partitions 22 thus define, along with the sides 19 and 21, pockets designated 23 which serve to receive and collect stones which are moved by the conveyor 10 into the space between the conveyor 10 and the concave 12. Of course it is commonly known that in the use of a threshing machine, and particularly in the harvesting of edible beans, stones may be picked up along with the crop and conveyed toward the concave 12. It is these stones that are to be caught in the trap 17 so that they do not pass to the concave 12.

The radially outer ends of the partitions 22 have angled portions 24 which serve to hold and guide the stones in the operation of the trap 17. Also, flexible seals 26 and 27 are respectively attached to the shelf 11 and the concave 12 to cooperate with the trap 17 and present a continuous support to the crop from the shelf 11 to the concave 12.

Thus the trap is disposed to provide a support for the crop and at the same time to permit the stones to fall into the pockets 23 and be collected therein. The trap may then be pivoted or rotated, and rotation may be in the direction of the arrow designated A, and the stones collected in what was formerly the upwardly disposed pocket 23 will be dumped from the trap immediately in front of the grain conveyor or bin 16 when the trap 17 is rotated or pivoted a sufficient amount to have the pocket disposed downwardly. In the dumping process, it will be apparent that the trap 17 does not lose its utility for providing a support for the crop in the space between the conveyor 10 and the concave 12. Thus the machine need not be stopped in its operation just for the purpose of emptying the trap 17. The trap could be rotated only one-quarter of a turn, where for instance there are pockets 23, and such slight rotation would require only a small amount of time until the next pocket 23 is in the full position for receiving the stones.

Figure 2:
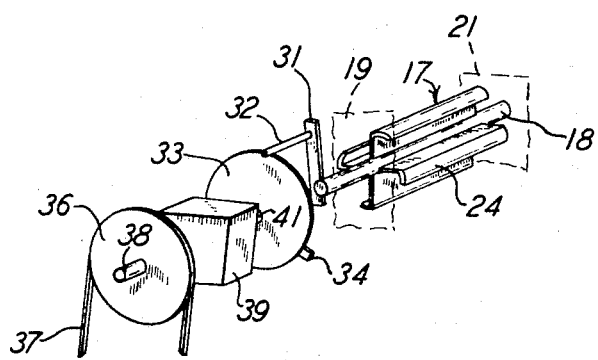
FIG. 2 is a perspective view on a reduced scale of part of that shown in FIG. 1, and having parts added thereto.

The trap 17 could be manipulated either by hand or it could be driven in synchronization with the operation of the machine. In the latter event, the trap could be periodically rotated or emptied so that any and all stones which may have been accumulated in an upwardly disposed pocket 23 would be released from the machine. FIG. 2 suggests one way in whch the trap 17 could be manually operated, and here it will be noted that a crank is provided on the shaft 18 by means of an arm 31 and a handle 32. Thus the operator could simply maneuver the handle 32 to rotate the trap 17 when and as desired.

The rotating mechanism also could be made automatic, and FIG. 2 diagrammatically shows how this could be accomplished. Here a disk 33 is rotatably mounted and has a projection 34 which would engage the handle 32 upon adequate rotation of the disk 33. This of course would then index the trap 17 in accordance with the movement of the projection 34. Such movement could be synchronized with the drive of the machine by means of a pulley 36 and a belt 37 which could be connected to the drive of say the conveyor 10. Thus the pulley 36 would be rotatably mounted on its shaft 38, and it would connect to a timing box 39 which in turn connects through a shaft 41 to the disk 33. Thus continuous rotation of the pulley 36, during the operation of the machine, would actuate any conventional timing or gearing in the timing box 39 for rotation of the disk 33 and extending of the handle 32, as mentioned. By this automatically operated means, the operator would of course not be required to check the trap 17 to see whether or not it need be emptied. Instead, the mechanism could be arranged so that the trap 17 would be automatically rotated or indexed in accordance with the conditions of the stone in the amount collected so that it would be self-serving. Also, the angled ends 24 serve to provide a partial shelf for the passage of crops between the space defined by the conveyor 10 and the concave 12, and the ends 24 also guide the dumping of the stone in front of the bin or conveyor 16.

While a specific embodiment of this invention have been shown and described, it would be obvious that certain changes could be made in the embodiment and the invention should therefore be determined only by the scope of the appended claims.

What is claimed is:

1. In a threshing machine of the type including a threshing concave and a conveyor for delivering material toward but to a point spaced from said concave, the combination comprising a stone trap rotatably mounted on said machine and spanning the space between said conveyor and said concave and having a plurality of separate pockets arranged with one thereof in an upwardly disposed position for receiving stones moved by said conveyor to said space while another of said pockets is in a downwardly disposed position for emptying itself of stones, and means connected to said stone trap for rotating the latter for emptying said stones from said pockets.

2. The subject matter of claim 1, wherein said means connected to said stone trap is cyclically operative means synchronized with the operation of said conveyor for periodically rotating said stone trap in synchronization with the movement of said conveyor, for dumping stones from said pockets.

3. The subject matter of claim 2, wherein said means connected to said stone trap is also manually operative for rotating said stone trap for dumping stones from said pockets.

4. The subject matter of claim 1, including seal means extending from said stone trap to both said conveyor to said concave.

5. The subject matter of claim 1, including radially extending partitions on said stone trap defining said pockets, and said stone trap having angled ends on the extending ends of said partitions and with said angled ends being angled off said partitions in the direction away from the direction of rotation.

6. In a threshing machine of the type including a threshing concave and a first conveyor for delivering material toward but to a point spaced from said concave, the combination comprising a stone trap pivotally mounted on said machine and spanning the space between said first conveyor and said concave and having an upwardly open pocket adapted to receive and collect stones moved by said first conveyor to said space, a second conveyor disposed directly below said concave and out of the vertical plane of said space, and means connected to said stone trap for pivoting the latter to a position where said pocket is downwardly disposed for emptying said stones from said pocket and downwardly through vertical plane and clear of said second conveyor.

References Cited

UNITED STATES PATENTS 1,116,885   11/1914   Hannan              171—85
2,305,159   12/1942   Heckman et al.
3,124,138    3/1964   Claas.

ANTONIO F. GUIDA, *Primary Examiner.*

UNITED STATES PATENT OFFICE
CERTIFICATE OF CORRECTION

Patent No. 3,433,230                                                  March 18, 1969

Gary V. Larsen

It is certified that error appears in the above identified patent and that said Letters Patent are hereby corrected as shown below:

Column 4, line 21, after "conveyor" insert -- and said concave for the support of material moving from said conveyor --; line 40, after "through" insert -- said --.

Signed and sealed this 7th day of April 1970.

(SEAL)
Attest:

Edward M. Fletcher, Jr.                                    WILLIAM E. SCHUYLER, JR.

Attesting Officer                                                    Commissioner of Patents